F. MEYER.
GEAR FASTENING DEVICE.
APPLICATION FILED SEPT. 23, 1909.
955,656.
Patented Apr. 19, 1910.
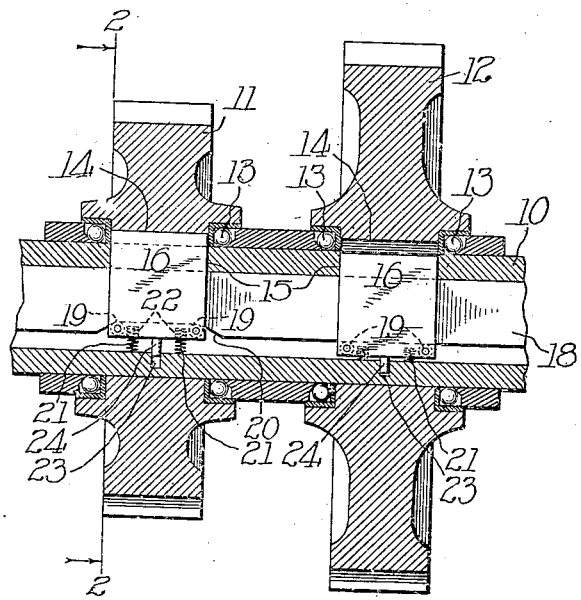
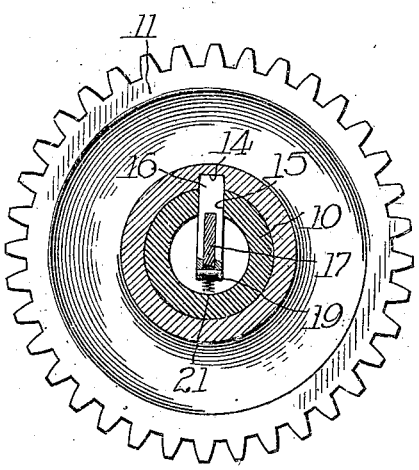
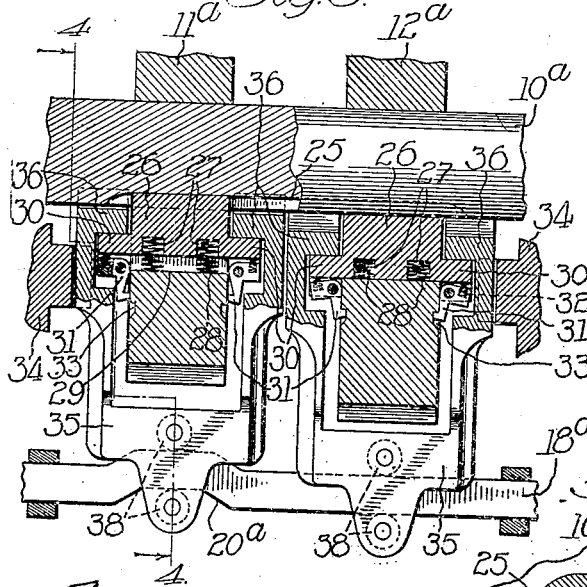
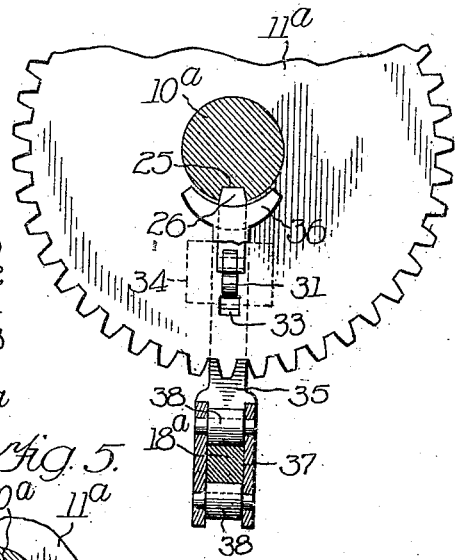
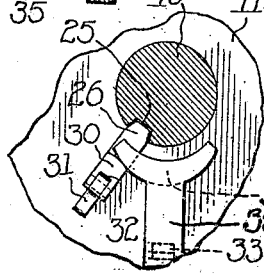

UNITED STATES PATENT OFFICE.

FRANK MEYER, OF MAYWOOD, ILLINOIS.

GEAR-FASTENING DEVICE.

955,656.  Specification of Letters Patent.  Patented Apr. 19, 1910.

Application filed September 23, 1909. Serial No. 519,240.

*To all whom it may concern:*

Be it known that I, FRANK MEYER, a citizen of the United States, residing at Maywood, in the county of Cook and State of Illinois, have invented certain new and useful Improvements in Gear-Fastening Devices, of which the following is a specification.

This invention relates to improvements in a device to be used for fastening or securing gears on the shafts on which they are mounted, and while it is more particularly intended for use in variable or change speed and equalizing gearing for automobiles, yet it is applicable for gears used for various other purposes, and it consists in certain peculiarities of the construction, novel arrangement and operation of the various parts thereof, as will be hereinafter more fully set forth and specifically claimed.

The principal object of the invention is to provide means whereby gears which are adapted to rotate on shafts, may be readily thrown in or out of engagement therewith, and in such a manner that the engagement will be positive.

Another object of the invention is to provide a gear fastening device which shall be simple and inexpensive in construction, strong, durable, and easily operated.

Other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1, is a central longitudinal sectional view through a shaft showing a pair of gears mounted thereon, and illustrating fastening devices therefor embodying one form of the invention, and showing one of the devices in engagement with the gear, the other device out of engagement with its gear. Fig. 2, is a cross-sectional veiw taken on line 2—2 looking in the direction indicated by the arrows. Fig. 3, is a view partly in section and partly in elevation of a portion of a shaft showing the part of two gears mounted thereon and illustrating a modification in the construction of the fastening devices therefor. Fig. 4, is a view partly in section and partly in elevation taken on line 4—4 of Fig. 3, looking in the direction indicated by the arrows. And Fig. 5, is a fragmental view of one of the gears showing a key in the act of being withdrawn from its seat in the shaft.

Like numerals of reference, refer to corresponding parts throughout the different views of the drawing.

Referring now to Figs. 1, and 2, of the drawing, the reference numeral 10, designates a portion of a hollow shaft, on which two gears 11, and 12, are shown as being mounted on ball-bearings 13, so as to rotate independently of the shaft, or in other words, loosely mounted thereon. As shown, each of the gears is provided on the inner surface of its hub with a recess or groove 14, which extends longitudinally with respect to the shaft so as to register with longitudinally disposed openings 15, formed in the shaft for the reception and operation of the fasteners or keys 16, which are extended through the openings 15, into the cavity of the shaft. Each of the keys 16, is formed with a groove 17, disposed longitudinally with respect to the shaft 10, and is for the purpose of receiving an operating bar 18, which may be of sufficient length to extend through the shaft at one of its ends, where it may be connected to an operating lever, (not shown) or said operating lever may be extended through a suitable opening in the shaft and connected to the bar.

Each of the keys 16, is provided at each end of its groove and at one of the edges thereof, with a roller 19, to coact with the adjacent edge of the operating bar 18, in its movement through the groove. As shown in Fig. 1, the operating bar 18, is provided in its edge adjacent to the rollers 19, with a recess or depression 20, which is inclined at each of its ends to facilitate the movement of the bar back and forth in the groove of the key. Each of the keys 16, is provided on its inner end with one or more springs 21, which rest at one of their ends against the inner surface of the shaft 10, and may have their other ends secured in nests or openings 22, therefor, in the key. At suitable points diametrically opposite the openings 15, in the shaft, the same is provided with sockets 23, to receive guiding pins 24, on the keys.

In Figs. 3, and 4, of the drawing, is shown a modification in the construction of the gear fastening device, which is adapted for use on solid shafts 10$^a$, instead of hollow ones as in the other construction. In this modified form, the shaft 10$^a$, on which the gears 11ª, and 12ª, are mounted, is provided with a longitudinally disposed opening or groove 25, for the reception of the inner ends of the keys 26, which have in their outer surfaces nests or sockets 27, to receive springs 28, which rest at their outer ends against the wall of the groove 29, formed in each of the gears 11ª, and 12ª, and longitudinally with respect to the shaft. As shown in Fig. 3, each of the keys 26, is provided on each of its sides with an extension 30, and each of said extensions has pivotally secured thereto, a dog 31, which dogs are actuated by springs 32, and are adapted to engage recesses 33, in the sides of the gears. Mounted on a suitable support 34, and radially to the shaft 10ª, and astride of each of the gears is a yoke 35, the inner ends of the prongs 36, of each of which are turned toward the gears, so as to engage the extensions 30, on the keys 26, as will be clearly understood by reference to Fig. 3, of the drawing. The inner ends of the prongs 36, are also segmental in shape or curved, (see Figs. 4, and 5,) for the purpose to be presently explained. The outer portion of each of the yokes 35, is provided with a groove 37, for the reception and operation of an operating bar 18ª, which has in its outer edge, one or more recesses 20ª, each of which preferably has its ends inclined. Each of the yokes 35, is provided in the groove 37, with rollers 38, to coact with the operating bar 18ª, in its movement through said groove.

From the foregoing and by reference to the drawing, it will be readily understood that when the construction shown in Figs. 1, and 2, is employed, the keys 16, may be held out of engagement with the gears by moving the operating bar in such a way that the recesses or depression 20, will be displaced from the groove of the key in which it is located, and when it is desired that the gears shall be fixed on the shaft, it is only necessary to move the operating bar 18, in such a way as to permit the recess 20, to engage the groove 16, of the key.

When the construction shown in Figs. 3, and 4, is used the operation is as follows:—
The operating bar 18ª, may be moved in the proper direction so that one of the outer rollers 38, on the yoke will ride out of the recess 20ª, in which operation it is apparent that the prongs 36, engaging with the extensions 30, on the key will withdraw the latter from the groove 25, in the shaft and permit the dogs 31, to engage the grooves or recesses 33, in the sides of the gear, thus holding the same out of engagement with the shaft.

Having thus fully described my invention what I claim as new and desire to secure by Letters-Patent is—

1. A gear fastening device consisting of a hollow shaft having an opening in its periphery and a socket diametrically opposite said opening, a gear mounted to turn on the shaft and having a recess in the inner surface of its hub to register with the said opening, a key located at one of its ends in the opening of the shaft and having at its other end a pin to fit in said socket and provided with an opening disposed longitudinally with respect to the shaft, a spring interposed between the end of the key on which the pin is mounted and the inner surface of the shaft, and an operating bar having a recess with its ends inwardly inclined in one of its edges and extended through the opening in the key.

2. A gear fastening device consisting of a hollow shaft having a plurality of openings in its periphery and a socket diametrically opposite each of said openings, a gear mounted to turn on the shaft around each of said openings and each having a recess in the inner surface of its hub to register with the opening which the gear surrounds, a key located at one of its ends in each of the openings of the shaft and each having at its other end a pin to fit in the sockets of the shaft, springs interposed between the inner ends of the keys and the inner surface of the shaft, and an operating bar having a plurality of recesses in one of its edges and extended through the openings in the keys.

FRANK MEYER.

Witnesses:
CHAS. C. TILLMAN,
J. E. HANSEN.